United States Patent [19]

Bauernfeind et al.

[11] 4,302,843
[45] Nov. 24, 1981

[54] METHOD AND APPARATUS FOR MEASURING TRANSMISSION CHARACTERISTICS OF A TEST OBJECT DURING COMMUNICATION GAPS

[75] Inventors: Karl Bauernfeind, Zorneding; Gerhard Blaess, Olching; Alfred Heindl, Poecking, all of Fed. Rep. of Germany

[73] Assignee: Siemens Aktiengesellschaft, Berlin & Munich, Fed. Rep. of Germany

[21] Appl. No.: 96,665

[22] Filed: Nov. 23, 1979

[30] Foreign Application Priority Data

Dec. 6, 1978 [DE] Fed. Rep. of Germany ....... 2852805

[51] Int. Cl.³ .................... H03K 13/32; H04B 17/00; H04Q 1/20
[52] U.S. Cl. ....................................... 375/10; 371/22; 371/27
[58] Field of Search ................. 179/175.2 R, 175.2 D, 179/175.31 R; 371/15, 22, 27; 324/77 R; 455/67, 266; 370/13, 17; 375/10; 364/481, 486, 487, 550, 551

[56] References Cited

U.S. PATENT DOCUMENTS 3,895,298  7/1975  Schollmeier .......................... 375/10

4,093,940  6/1978  Maniere ............................... 371/22

OTHER PUBLICATIONS

CCI Recommendation No. 0.81, vol. IV, 2, pp. 44–50.
Bell Laboratories Record, vol. 43, No. 9, Oct. 1965, pp. 369–372.
Electronic Engineering, Aug. 1966, pp.5 15–519.

*Primary Examiner*—Benedict V. Safourek
*Attorney, Agent, or Firm*—Hill, Van Santen, Steadman, Chiara & Simpson

[57] ABSTRACT

A method for measuring the transmission characteristics of a transmission line during gaps in communications on said transmission line consists of monitoring the transmission line for a gap in communication thereon, and applying an identifier signal followed by a test pulse to the input of the transmission line when such a communications gap is recognized. An output of the transmission line is monitored and when the identifier signal is recognized, the test pulse which follows the identifier is evaluated. The test pulse is made up of a plurality of component frequencies at equally spaced intervals, and evaluation of the test pulse at the output yields the attenuation of phase characteristics of the transmission line for each component frequency, without interfering with communications on the line.

15 Claims, 4 Drawing Figures

METHOD AND APPARATUS FOR MEASURING TRANSMISSION CHARACTERISTICS OF A TEST OBJECT DURING COMMUNICATION GAPS

FIELD OF THE INVENTION

This invention relates to a method of measuring the transmission characteristics of a communication and transmission line, during gaps in communication over such line.

THE PRIOR ART

A method of measuring the transfer function of an object under test is known from the article in "Electronic Engineering", August, 1966, pages 516-519. As described therein, a function having infinitely narrow pulses supplies a constant amplitude distribution of harmonics at all frequencies to a device under test. A sequence of such narrow pulses is delivered to the object under test, and the waveform of the signal which is produced at the output of the object under test, is recorded after sampling and subjection to Fourier analysis. The test pulse (or exciting pulse) is also sampled and subjected to Fourier analysis in the same way. In practice, an infinitely short pulse cannot be employed, but a pulse which is as short as possible is used, which produces a spectral function of sin x/x.

The prior art method has the disadvantage that both the test pulse and the distorted pulse must be recorded and subjected to Fourier analysis. When the object under test is a transmission line, the problem arises that the test pulse is not directly available at the output end of the transmission line. Thus, either an additional transmission must be undertaken of the exciting pulse, or data relating thereto, or else the data at the output end of the transmission line must be retransmitted to the input end. This requires a relatively large amount of equipment, and there is also the disadvantage that any kind of transmission failure directly influences the result of the measurement. Further, errors may enter into the measurement during the Fourier analysis, both at the input end and the output end of the transmission line.

The infinitely numerous harmonics of the exciting function sin x/x occurring with such pulses occupy very wide frequency bands and lead to disruptions of communications in adjacent channels when the measurement is undertaken in specific channels. It is also disadvantageous for practical operation that the amplitudes of the individual harmonics are predetermined by the form of the exciting pulse employed and therefore cannot be freely selected. This is particularly disadvantageous when the object under test has a filter characteristic, because of limitations on the precision of the measurement of the transmission characteristics.

In the measurement of transmission characteristics for transmission lines, typically the measurements must take place when there is no communication taking place on the transmission line. It is desirable to provide a means for measuring transmission characteristics irrespective of the presence of a communication on the transmission line, in such a way that the precision of the measurements is assured.

BRIEF SUMMARY OF THE INVENTION

A principal object of the present invention is to provide a method and apparatus for precisely measuring the transmission characteristics of a transmission line during gaps in communications taking place on such line, so that the communication transmission is disrupted as little as possible.

In accordance with one embodiment of the present invention, a continuous monitoring of gaps in communication is undertaken, and a test pulse is transmitted from one end of the line to the other during such a gap. The test pulse is preceded by an identification signal, and at the other end of the line, the line is continuously monitored by an identifier monitoring circuit so that, after arrival of the identifier signal, an evaluation device is gated on for processing the test pulse which follows the identifier.

Since the test pulse is transmitted in a gap in the communication, such as a speech pause, or a switching pause, no communication signal is superimposed on the test pulse, so there is no modification of the amplitudes of the components of the test pulse. The evaluation of the test pulse calculates the frequency dependent attenuation, the group transit time distortion, or the like.

It is a particular advantage of the present invention that the test pulse, which has a very short duration, cannot be picked up by the human ear as an individual signal, but is rather interpreted as a very short noise. The test pulses in accordance with the present invention can be kept relatively short, on the order of 5 to 50 ms, which in many cases, is not a sufficient length of time to cause a test pulse to be comprehended at all by the human ear. The use of an identifier preceding the test pulse assures that the evaluation device at the output end of the transmission line is gated into operation only when a test pulse is present.

When the gaps in the communication are sufficiently long, it is possible that a number of test pulses may be transmitted in succession. The duration of a single test pulse is fixed at a minimum by one full period of the lowest frequency component of the test pulse, so that when the lowest frequency is 100 Hz, the pulse must last at least 10 ms. If an extremely high resolution is required, the minimum frequency may be 10 Hz, which requires the period of a test pulse of 100 ms. This period, however, lies at the boundary at which the human ear begins to perceive a noise.

In accordance with one embodiment of the invention, a test pulse is employed which is made of a plurality of components having different frequencies, and the amplitudes of the components near the cut-off frequencies of the filter are selected larger than the amplitudes of components within the pass band of the object under test.

In the present invention, the test pulse consists of a series of oscillations of different frequencies which have predetermined amplitudes in initial phases and are formed according to the equation:

$$V_{(t)} \sum_{1}^{m} A_m \cos(2 \cdot \pi \cdot f \cdot t - \phi_m)$$

where $A_n$ is the amplitude of a component n and $\phi_n$ is the initial phase of a component having a frequency $n \times f$.

An advantageous result of the present invention is that the adjustment of the amplitudes of the components at the input side of the object under test can take place very simply and has no disadvantageous consequences affecting the quality of the measurement. Particularly large amplitude values are available in the region of the cut-off frequencies, and the relatively great attenuation there can readily be determined, and the signal-to-noise ratio minimized. In the band pass region, the lower amplitude values suffice for precise measurement, because of the lower attenuation.

The apparatus in one embodiment of the present invention incorporates a storage device at the input side of the transmission line which contains a multiplicity of time sample values from a test pulse formed with the individual components with their different amplitude values, and another storage device, which stores the identifier. Both the identifier and the sampling values are read out rapidly in succession to form a sequence consisting of the identifier followed by the test or exciting pulse. A storage device is also provided on the output side of the transmission line, in which the parameters of the test pulse, including the original amplitude values, are likewise stored and are available for evaluation of the distorted pulse received at the output of the transmission line. A decoder circuit is also provided at the output end, which senses the arrival of the identifier, and places the evaluation device in operation.

BRIEF DESCRIPTION OF THE DRAWINGS

Reference will now be made to the accompanying drawings in which.

DESCRIPTION OF THE PREFERRED EMBODIMENT

Figure 1:
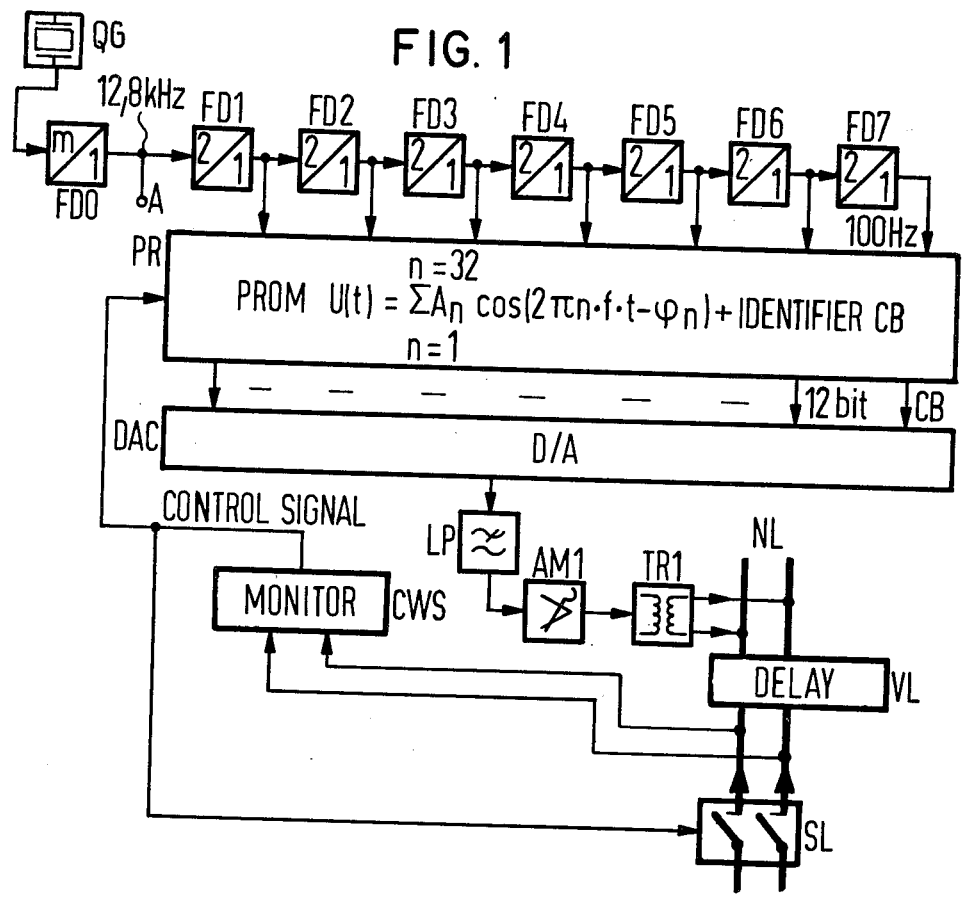
FIG. 1 is a functional block diagram of apparatus for generating a test pulse.

Referring now to FIG. 1, apparatus is illustrated for generating a test pulse to be applied to an object under test NL. As an example, the object under test NL may be a data or telephone channel having a bandwidth of 300 Hz through 3 kHz. A crystal oscillator QG generates a signal which is connected to the input of a frequency divider FD0, which produces as its output a square wave of 12.8 kHz. This signal is applied to a series of six frequency dividers FD1 through FD6, connected in cascade, to form a binary counter. The output of each of the flip-flops FD1–FD6 are connected as address inputs to a programmable read-only memory unit (PROM) PR. A total of sixty-four different combinations of output signals are produced by the frequency dividers FD1–FD6, which successively address sixty-four storage locations within the PROM unit PR. Each memory location of the PROM unit PR contains a 12-bit word which, when accessed, is read out to the input terminals of a digital-to-analog converter DAC, which produces at its output an analog signal having an amplitude at each instant corresponding to the 12-bit digital word being accessed at that instant. Each of 12-bit words contains the digitized instantaneous amplitude value of an undistorted time function:

$$V_{(t)} \sum_{m=1}^{m=16} A_m \cdot \cos(2\pi \cdot m \cdot f \cdot t - \phi_m)$$

By reading out the data stored in successive storage locations of the PROM unit PR, at test pulse is generated as a step curve, the amplitude of which proceeds directly from step-to-step without any gap or return to a reference value between successive steps. The copending application to Blaess, Ser. No. 910,769, filed May 30, 1978, discloses an arrangement for generating a test pulse.

The test pulse has a period given by $1/f_1$ whereby $f_1$ represents the frequency of the lowest harmonic, which in the example which follows is 200 Hz.

A test pulse may be formed, for example, of sixteen individual harmonics, each having a frequency separation of 200 Hz, occupying a frequency band of between 200 Hz through 3200 Hz. A sampling frequency must be employed which is high enough so that the highest frequency (3200 Hz) is sampled more than twice. According to the sampling frequency, it must exceed 6400 Hz. In the present example, the selected sampling frequency is 12.8 kHz, so the sampling requirement for the highest frequency is met with certainty.

Since the lowest harmonic frequency is 200 Hz, the period of the test pulse is 5 ms. During each 5 ms period, the sixty-four successive sampling values are read out of the PROM unit PR, one for each cycle of the 12.8 kHz frequency, so that the interval between successive steps of the test pulse is 78.125 microseconds.

The waveform of the test pulse, with its sixteen components, is determined either by computation or graphically, with individual amplitudes $A_1$ through $A_{16}$, and with initial phase angles of $\phi_1$ through $\phi_{16}$. The amplitude of the composite test pulse is digitized and entered into the storage locations of the PROM unit PR, each digitized value corresponding to the average amplitude during an interval of 78.125 microseconds. Accordingly, when the sixty-four storage locations of the PROM unit are accessed successively, the output of the digital-to-analog converter DAC corresponds closely to the graph or computed test pulse. A low-pass filter LP is connected to the output of the digital-to-analog converter DAC to smooth the test pulse. During operation, all of the storage locations of the PROM unit PR are accessed repetitively, so that after each 5 ms period of the test pulse, a new test pulse begins at once. A sufficient number of test pulses are transmitted in succession in this manner until transients are dissipated, and the response at the output end of the object under test is constant from period to period. At least one period T has been sampled at the output end of the object under test, at the same rate as the sampling takes place at the input end, to yield sixty-four sampling values, which are stored and subjected to the Fourier analysis in either analog or digital form. The result of such analysis is to produce parameters corresponding to the individual amplitude values $A_1*$ through $A_{16}*$ (at the output end of the object under test) as well as the corresponding phase angles $\phi_1*$ through $\phi_{16}*$.

If there is any distortion such as attentuation or phase shift which occurs in the low-pass filter LP, this can be compensated by means of a preliminary correction of the sampling values so as to counteract or compensate for the distortion.

The output of the low-pass filter LP is passed through an amplifier $AM_1$, which has an adjustable gain, to an adapter circuit TR1 which may be for example a line transmitter. The output of the adapter circuit TR1 is connected to the input of the transmission line NL.

Figure 2:
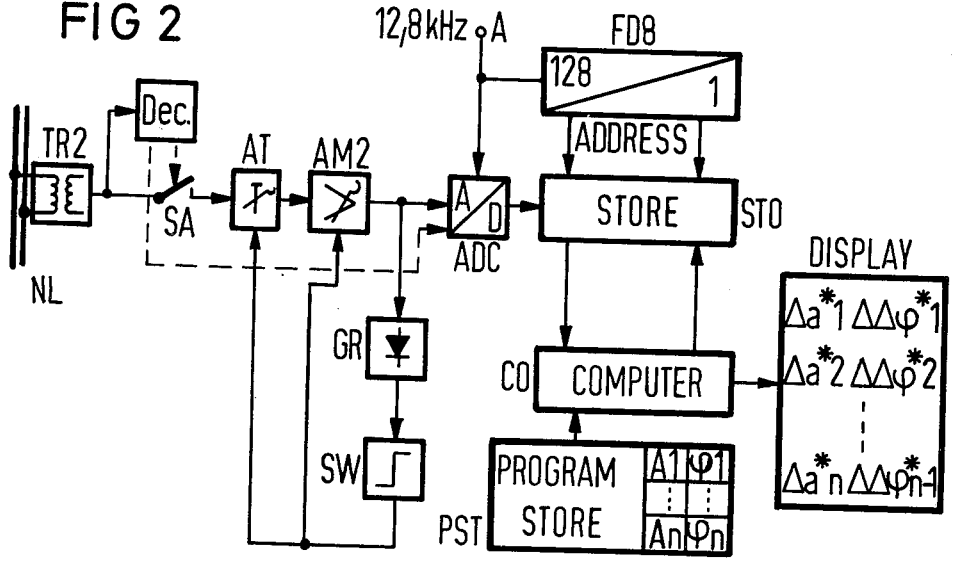
FIG. 2 is a functional block diagram of apparatus located at the output side of the transmission line for evaluating the distorted test pulse.

FIG. 2 illustrates apparatus located at the output side of the transmission line NL, for evaluating the transmission characteristics of the object under test TL. The distorted test pulse first arrives at an adapter circuit TR2, the output of which is connected to the input of an attenuator AT. The output of the attenuator is passed through an amplifier AM2 and arrives at the input of an analog-to-digital converter unit ADC. The output of the amplifier AM2 is also connected through a rectifier GR to the input of a threshold circuit SW which produces a signal which adjusts the gain of the attenuator AT and the amplifier AM2. In this way, the gain of the attenuator and amplifier are adjusted so that the maximum amplitude of the distorted test pulse is equal to a fixed value. The speed of response of the circuit including the rectifier GR and the threshold circuit SW is sufficiently slow, so that the characteristics of the attenuator AT and the amplifier AM2 remain substantially constant throughout the period of the received pulse, after an initial transient period.

The analog-to-digital converter ADC is provided with a sample-and-hold circuit, which circuit is sampled by clock pulses at a frequency of 12.8 kHz, supplied to a terminal A. These signals correspond precisely to the clock signals employed in the apparatus of FIG. 1, and may be derived by connection to terminal A at the output of the divider FD0 in FIG. 1.

The clock frequency is also supplied to a frequency divider FD7 which functions as a 6-bit binary counter, the outputs of which are connected to the address inputs of a storage device STO. The divider FD7 may be constructed identically to the chain of frequency dividers FD1-FD6 illustrated in FIG. 1. The storage device STO functions to store the digital outputs of the analog-to-digital converter ADC at each of sixty-four memory locations which are accessed by FD7. After sixty-four time periods have been sampled and stored, the storage device contains the digitized amplitudes corresponding to one 5 ms period of the test pulse, and the sampling and storage operation is then terminated (by means not shown).

Subsequently, the storage device STO cooperates with a computer CO by which the sixty-four sample values are subjected to a fast Fourier transform, in the manner described in the book by G. Oran Brigham, "The Fast Fourier Transform", at pages 163-171. The program for this transform is contained in the program storage device PST, which is connected with a computer CO, and which also incorporates a storage unit storing representations of the individual amplitude values $A_1, A_2, \ldots A_n$, and the initial phase angles $\phi_1, \phi_2, \ldots \phi_n$, for the original (undistorted) test pulse.

The fast Fourier transform program converts data from the time domain into the frequency domain, to yield the real ($R_{n*}$) and imaginary ($I_{n*}$) parts for each of the sixteen harmonics making up the test pulse. From these parts, the amplitude $A_{n*}$ for each harmonic may be calculated according to the equation:

$$A_{m*} = \sqrt{(R_{m*})^2 + (I_{m*})^2}$$

The phase $\phi_{n*}$ may also be calculated, according to the equation:

$$\phi_{n*} = \text{arc } tg(I_{n*}/R_{n*})$$

Programs for making these calculations are also contained in the program store unit PST.

Where the object under test NL has a frequency dependent attenuation, such as due to a filter characteristic or the like, then the individual amplitudes $A_{1*} \ldots A_{n*}$ are not identical to the individual amplitudes $A_1 \ldots A_n$ of which the undistorted test pulse was composed. The change in amplitude $a_{n*}$ due to the object under test, which indicates the attenuation distortion at the various frequency values $F_1$ through $F_n$, is calculated for each harmonic by the equation:

$$a_{n*} = A_{n*}/A_n.$$

The values $a_{n*}$ for the several harmonics is presented visually on a suitable display device DSP controlled by the computer CO. The display program is contained in the program store unit PST, which also stores the amplitude distribution of the original test pulse.

Where the object under test also has a frequency dependent phase shift, then the difference in the phase angle of two adjacent harmonics is a measure of the group transit time, according to the equation:

$$\tau_g = d\phi*/d\omega \approx \Delta(\Delta\phi_{n*})/\Delta\omega$$

This equation gives a precise result when there are a great number of harmonics within the pass band being investigated. In that event, the simplification $\Delta\omega = 2\pi \times f_1 =$ constant is valid.

In order to determine the difference in the phase change of neighboring harmonics, the change in phase of each harmonic is first determined according to the equation:

$$\Delta\phi_{n*} = \phi_{n*} = \phi_n$$

The values of $\phi_n$, which are the phases of the harmonics of the original test pulse, are stored in the program store unit PST. The difference in the phase change of two neighboring harmonics is thus $$\Delta(\Delta \phi_{m*}) = (\phi_{m*} + 1 - \phi_m + 1) - (\phi_{m*} - \phi_m)$$
$$= (\phi_{m*} + 1 - \phi_{m*}) - (\phi_m + 1 - \phi_m)$$

Thus, the group transit time $\tau_g$ can be calculated from data located in the storage device STO and the program store PST, and presented on the display device DSP.

Although the group transit time $\tau_g$ can be measured absolutely when a complete loop of a transmission line is being tested, the absolute value of $\tau_g$ cannot be determined when only a segment is being measured, because of lack of the reference time. By the procedure outlined above, however, the group transit time distortion is indicated by any selected frequency.

Although the apparatus of FIGS. 1 and 2 have been described as digital devices, it is possible to employ analog memories and evaluation devices in place of the digital ones.

Although the time domain values for the successive portions of the test pulse are stored at the input side in the PROM unit PR, preferably the values for the frequency domain are stored in the program control unit PST at the output side, because the Fourier analysis is carried out at the output end of the object under test, and the comparison of the Fourier parameters can be made there simply.

Figure 3:
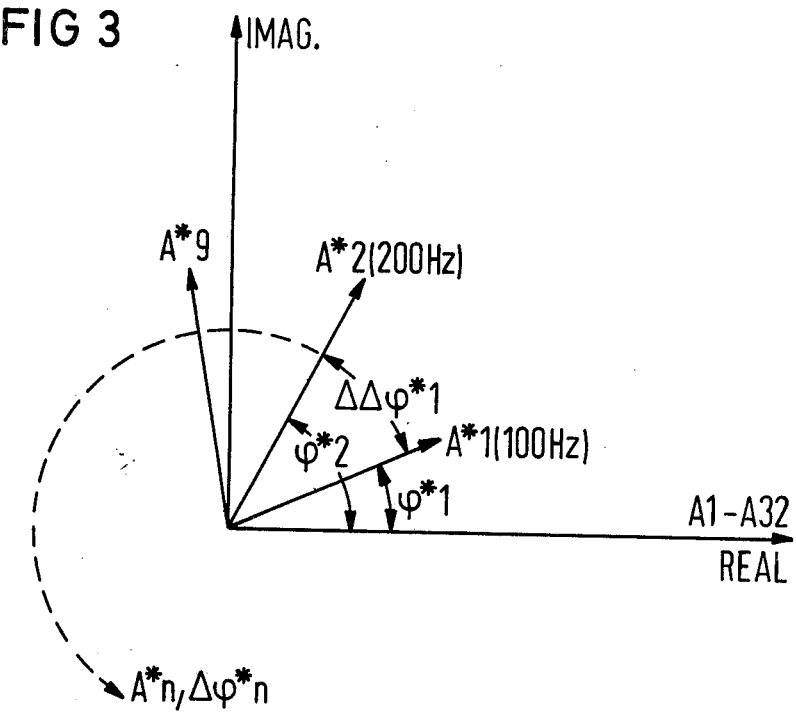
FIG. 3 is a vector diagram of individual components of the test pulse after Fourier analysis at the output end of the object under test.

FIG. 3 is a vector diagram showing the relationships for the values $\phi*1$ through $\phi*n$ and $A*1$ through $A*n$ obtained at the output of the circuit of FIG. 2. The amplitude values A1 through A32, at the input end of the transmission line, are assumed to be parallel to the real axis, and the amplitudes and phase angles for components 1, 2 and 9 are illustrated. Each has a unique amplitude, at the output of the transmission line, and a phase shift counterclockwise is illustrated in FIG. 3, relative to the initial phase of the test pulse. A phase displacement of $\Delta\Delta\phi*1$ exists between the vector $A*1$ and the vector $A*2$, and this phase displacement may be presented on the display device of FIG. 2, as a measure for the group transit time in the frequency range between 100 Hz and 200 Hz, the frequencies of A1 and A2. In the same manner, group transit times may be calculated as between components at other frequencies. A complete vector diagram constructed according to FIG. 3 would indicate the total result calculated by the computer CO of FIG. 2.

In the evaluation, $A*1$ must be related to A1, $A*2$ must be related to A2 and so on in order to arrive at the attenuation factors at the respective frequencies.

It will now be described how the test pulse is transmitted and evaluated during intercommunication gaps. In FIG. 1, a transmission line NL is illustrated which may be a telephone channel or the like carrying a voice or a radio transmission. Pauses occur in the communication flow due to gaps in speech, and to switching pauses. During these gaps, the transmission characteristics of the transmission line NL are to be measured. A monitoring circuit CWS is connected to the line NL, for detecting when a pause in the communication occurs. Pauses in vocal conversation generally have a certain predetermined minimum length, and the monitoring circuit CWS generates a control signal when such a pause is recognized. The control signal is connected to the PROM unit PR, and the contents of the PROM unit are read out in sequence, comprising first the identifier, and then the sample values for the test pulse. If desired, the identifier may be stored in a separate memory and read out as needed. The identifier, and the test pulse, are supplied to the low-pass filter LP and from there through the amplifier AM1 and the coupling device TR1 to the line NL. The test pulse may be either a single test pulse, or a sequence of test pulses, with each after the first beginning coincidentally with the end of the preceding pulse.

The transmission line is connected (FIG. 2) through the coupling circuit TR2 to a decoder DEC, which monitors the signals on the transmission line and produce a signal when the identifier is recognized. When the identifier is recognized, the decoder closes the switch SA, connecting the coupling device TR2 through the amplifiers AT and AM2 to the input of the analog-to-digital converter ADC. The analog-to-digital converter may also receive a gating signal from the decoder, to gate it into its operative condition when the identifier is recognized. The evaluation of the test pulse, as it is received by the coupling circuit TR2, may then take place as described above.

A pair of switches SL are shown in FIG. 1, controllable by the signal generated by the monitoring device CWS. These switches are open momentarily in response to such signal, in order to minimize the chance of noise or other signals interfering with the test pulse during the communication gap. Similar switches may also be placed in the transmission line at the receiving end, and operated by the decoder, in response to sensing an identifier on the transmission line.

Figure 4:
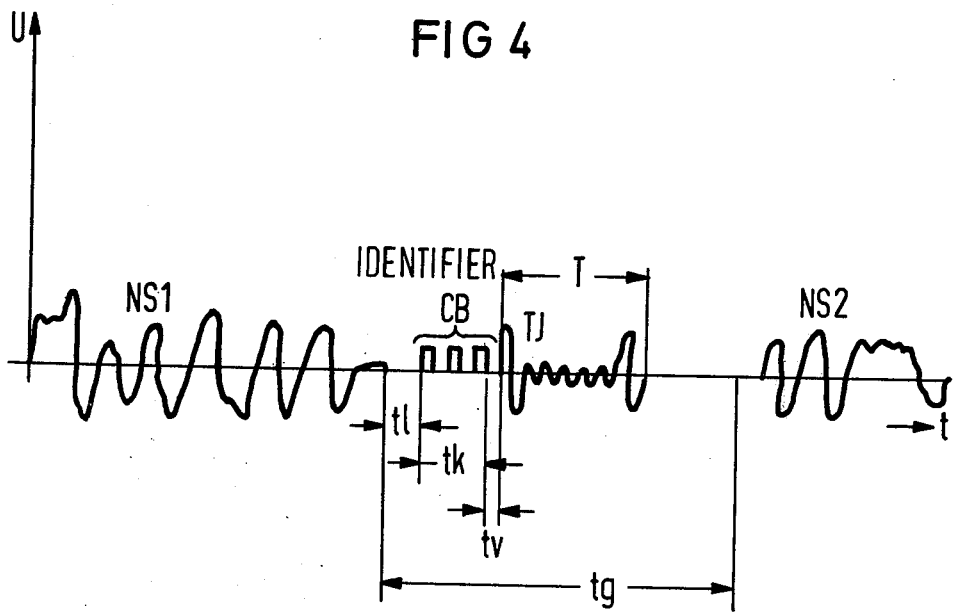
FIG. 4 is a diagram illustrating an identifier and a test pulse contained within a communications gap.

FIG. 4 illustrates the waveform signals on the transmission line during a typical period, there being a gap between communication parts NS1 and NS2. At the beginning of the gap, the monitoring circuit CWS monitors the zero voltage level on the transmission line, and after a time t1, a gap identifying signal is produced. The program store PR (FIG. 1) is thus caused to produce the identifier CB, followed by the test pulse TJ. The duration of the identifier tk, and a gap of tv intervenes between the identifier and the test pulse. The period of the test pulse TJ is T. The identifier illustrated in FIG. 4 consists of three rectangular pulses, but it is apparent that another identifier waveform may be employed if desired.

Either one or several test pulses may be transmitted in the gap, each one after the first beginning coincidentally with the end of the preceding pulse, but preferably only so many test pulses are transmitted that they cannot be perceived as noise, i.e., they do not exceed the response threshold of the human ear. If desired, one or a group of test pulses may be transmitted during successive conversational gaps, and the measurement becomes more precise with the greater number of pulses evaluated.

In cases in which it is not certain how long a gap is between individual communication signal NS1 and NS2, a delay element VL may be employed in the communication line NL, at a point which is downstream of the connections to the monitoring circuit CWS, but upstream of the coupling circuit TR1. When the delay time of the delay circuit VL is equal to the sum of tk plus tv plus T, in such a case, the monitoring circuit CWS is constructed to produce its control signal after a gap has occurred which exceeds the total time required, and it is thereby assured that the gap is sufficient to allow the insertion of the identifier and test pulse. It will be appreciated that the delay device VL can be omitted, when the transmission line is of a type which makes it probable that the communication gaps of the appropriate length will occur.

An alternative arrangement for insuring that gaps of the required length occur in the transmission line, involves the switches SL (FIG. 1). When the monitoring circuit CWS recognizes a brief gap, it produces its control signal, which opens the switches SL, as described above. The signal preferably holds the switches SL open for the period required for the identifier and the test pulse, after which the switches SL are closed immediately. Even if a voice communication is interrupted for part of this period, such as 50 to 100 ms, an interruption of transmission of this time interval is not noticed and is not felt to be disruptive.

From the foregoing, it will be appreciated that the present invention offers an expedient method for measuring the transmission characteristics of a transmission line in use. Others skilled in the art may make various modifications and additions in the method and apparatus of this invention without departing from the essential features of novelty thereof which are intended to be defined and secured by the appended claims.

What is claimed is:

1. A method of measuring the transmission characteristics of a transmission line by applying a test pulse to an input to the transmission line and evaluating, by Fourier analysis, the deformation of the test pulse as it is produced at an output of the transmission line, said test pulse being formed of a plurality of components having a preselected number of different frequencies and predetermined amplitudes and initial phase angles, and formed according to the equation:

$$V_{(t)} = \sum_{1}^{n} A_n \cos(2 \cdot \pi \cdot f \cdot t - \phi_n)$$

where $A_n$ is the amplitude of the nth component and $\phi_n$ is the initial phase angle of component n, such component having a frequency equal to n.f, including the steps of continuously monitoring the transmission line at its input for a communication gap, signalling the appearance of said gap, transmitting an identifier and a test pulse over said transmission line during and signalled communication gap, continuously monitoring the transmission line at an output for said identifier, and evaluating said test pulse at said output subsequent to the detection of said identifier.

2. The method according to claim 1, including the step of selecting the duration of the test pulse in the order of 5 to 50 ms, thus being below the threshold of audibility.

3. The method according to claim 1, including the steps of storing a plurality of sample values of said test pulse at said input, and reading out to said transmission line said stored values successively when a communication gap is recognized.

4. The method according to claim 3, including the step of open circuiting the communication line for the duration of the identifier and the test pulse.

5. The method according to claim 1, including the step of supplying said test pulse to said input for a period which equals at least a full period of the lowest frequency component of said test pulse.

6. The method according to claim 1, including the step of transmitting a succession of test pulses, with each pulse after the first beginning coincidentally with the ending of the preceding pulse.

7. The method according to claim 1, including the step of storing a plurality of sampling values of a complete test pulse in a storage device, and reading out to said transmission line said sampling values at a frequency which is more than twice as high as the highest frequency component of said test pulse.

8. The method according to claim 7, including the step of storing sufficient sampling values so that the period of said test pulse exceeds the period of the component of the lowest frequency.

9. The method according to claim 8, including the step of employing the same sampling frequency for a generation of said test pulse at said input, and for sampling the test pulse as it is received at said output.

10. Apparatus for measuring the transmission characteristics of a transmission line comprising in combination first storage means located near an input of said transmission line, and being connected with its output to said transmission line, said first storage means storing a plurality of sampling values corresponding to the magnitude, at consecutive time intervals, of a test pulse formed of a preselected number of individual components at preselected frequencies, said first storage means storing an identifier, means for reading out said identifier from said first storage means and said sampling values from said first storage means in succession, during a gap in communication over said transmission line, a monitoring circuit for monitoring said transmission line and producing a control signal in response to said communications gap, second storage means located at an output of said transmission line, said second storage means storing values corresponding to the initial parameters of said test pulse, means for sampling sequential intervals of the test pulse as it arrives at said output, means for deriving values corresponding to the parameters of said components as they are presented at said output, means for comparing said derived values with the values stored in said second storage means, and a decoder circuit at said output for monitoring said transmission line and for inhibiting operation of said comparing means, except after said identifier is recognized.

11. Apparatus according to claim 10, wherein said first storage device is a digital storage device, and including a digital-to-analog converter and a low-pass filter connected between said digital storage device and said transmission line.

12. Apparatus according to claim 10, including a control circuit interconnected between said output and the input of said sampling means for holding the maximum amplitude of said test pulse to a uniform level as it is sampled.

13. Apparatus according to claim 10, wherein said first storage means stores time domain data relating to said test pulse, and said second storage means stores frequency domain data relating to said test pulse.

14. Apparatus according to claim 10, including a delay device inserted in the transmission line at a point downstream of said monitoring circuit, and upstream of said input.

15. Apparatus according to claim 10, including one or more switches inserted in said communication line, and means for opening said switches during transmission of an identifier and a test pulse.

* * * * *